UNITED STATES PATENT OFFICE.

NAGAYOSHI NAGAI, OF TOKYO-FU, JAPAN, ASSIGNOR TO M. DICK BUNNELL, OF SAN FRANCISCO, CALIFORNIA.

SYNTHETIC ANESTHETIC AND PROCESS OF MAKING SAME.

1,399,312.  Specification of Letters Patent.  Patented Dec. 6, 1921.

No Drawing.  Application filed March 28, 1916. Serial No. 87,323.

*To all whom it may concern:*

Be it known that I, NAGAYOSHI NAGAI, of No. 3 Aoyama Minami-machi Shichi-chome, Shibuya-machi, Toyotama-gun, Tokyo-fu, in the Empire of Japan, have invented certain new and useful Improvements in and Relating to Synthetic Anesthetics and Processes of Making Same; and I do hereby declare the following to be a full, clear, and exact description of the invention, such as will enable others skilled in the art to which it appertains to make and use the same.

This invention relates to the preparation of local anesthetic substances and particularly to the synthesis of two new alkaloids which are hereinafter referred to as "allocain S" ($C_{20}H_{25}NO_2$) and "allocain A" ($C_{18}H_{21}NO_2$) respectively. The object of the invention is to obtain by a novel, cheap, simple, chemical synthetic process such new alkaloids which are effective for the purpose of local anesthesis.

The basis for the synthetic preparation of these two alkaloids is "mydriatin" ($C_9H_{13}NO$) having the following constitution:—

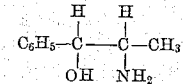

This substance is prepared by the process set forth in the specification of Japanese Patent No. 27056.

According to this invention the "mydriatin" is first treated with an ethyl halid such as ethyl bromid or ethyl iodid, and then either with a benzoyl halid or benzoic anhydrid.

As a concrete example of the process in accordance with the invention, the case in which ethyl bromid and benzoyl chlorid are used is taken. An alkali carbonate is added to the sulfate or chlorid of mydriatin to set free the mydriatin and to combine with the bromin of an excess of ethyl bromid which is added after the addition of water to dissolve the sulfate or chlorid of mydriatin. This mixture is digested in a vessel provided with a reflux cooler, for several hours over a water bath, at a temperature of 30-40 degrees centigrade. Mono-ethyl-mydriatin and diethlmydriatin are simultaneously formed in the digestion, according to the equation:—

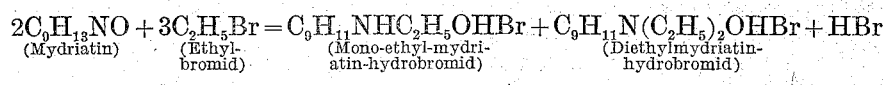

Thus the vessel will contain a mixture of those mydriatin compounds as well as a small quantity of unchanged mydriatin.

In order to separate the above products from one another, either ether free from alcohol, to dissolve the mixture of the basic substances—mono-ethylmydriatin, diethylmydriatin and unchanged mydriatin, is first added and then benzoyl chlorid is gradually added to form benzoyl compounds of the mono-ethyl and diethyl-mydriatin, or an etherial solution of benzoyl chlorid is added to the mixture at once, and in either case the mixture is shaken vigorously at ordinary temperatures until crystalline substances formed in the action entirely disappear. The reaction probably takes place according to the equation:

The compounds thus prepared, namely, benzoylmonoethylmydriatin and benzoyldiethylmydriatin, may be administered as so prepared, that is, in combination or admixture or the etherial solution may be separated from the alkaline liquid by means of a separating funnel. Dilute acid, hydrochloric acid being used in practice, is added gradually to the etherial solution which is shaken vigorously and this process is continued until the watery layer in the mixture becomes acid. By this process "allocain S" passes over entirely to the watery layer as hydrochlorid, while the benzoyl compound of monoethylmydriatin remains dissolved in the ether.

By separating the etherial solution from the watery or dilute acid liquid by means of a separating funnel and completely evaporating the aqueous solution under reduced pressure, "allocain S" will be obtained as the hydrochlorid in the form of a colorless, transparent, vitreous mass. The constitution of "allocain S" is:—

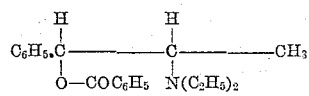

"Allocain A" is obtained in a pure state from the residual etherial solution of the benzoyl compound of mono-ethylmydriatin by the following process. First, the ether is evaporated off and about 30% hydrochloric acid is added to the residue; the latter is heated over a water bath until solid substances no longer appear even when cooled. Water is added to the solution. Then it becomes turbid owing to the separation of a small quantity of indifferent substances. The turbid solution is filtered, and ether added to the filtrate in sufficient quantity to dissolve the remaining small quantity of the indifferent substances. The whole is shaken when these substances will dissolve and disappear. The acid solution is separated from the ether by a separating funnel, filtered, if necessary, and evaporated over a water bath, when the action represented by the following equation takes place:—

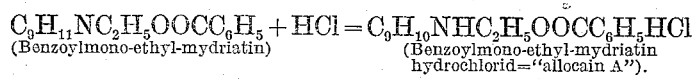

Then "allocain A" as hydrochlorid appears to shoot out in beautiful flat crystalline needles, which when cooled will almost entirely separate themselves from the mother liquid. The constitution of "allocain A" is the following:—

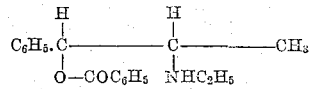

The crystals are collected from the mother liquor by filtering and are washed with acidified cold water to take away any impure salt which might remain. The crystals are then dissolved in a small quantity of warm water and, when they are brought down again by cooling, "allocain hydrochlorid A" in the purest state is obtained.

In the example of the process described above, ethyl bromid and benzoic chlorid are used, but it is naturally to be understood that the two "allocains" can be produced by using other ethyl halids such as ethyl iodid instead of ethyl bromid, and benzoic anhydrid instead of its chlorid; but no special advantages can be obtained by such alternative method.

According to the experiments made in connection with this invention, the various derivatives of mydriatin, benzoyl derivatives of mono- and di-alkyl and alkaryl, which term as here and hereinafter used, signifies either a group belonging to the aliphatic series or a group belonging to the aromatic series, mydriatin, benzoyl derivatives of phenyl-amino-alcohols either of higher or lower homologues of mydriatin, and benzoyl derivatives of mono- and di-alkyl or alkaryl derivatives of those phenylaminoalcohols possess more or less anethetic properties. However, others have no special advantage when compared with the two allocain compounds in question which can be produced with minimum expense and in a simple manner.

What I claim is:

1. As a new compound, an organic acid ester of a mydriatin derivative, said compound having probably the formula

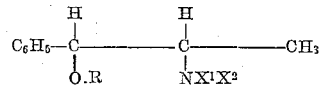

where R is an organic acid radical; $X^1$ is hydrogen, or an alkaryl group; and $X^2$ is an alkaryl group.

2. As a new compound, a benzoylethylmydriatin.

3. As a new compound, benzoylmono-ethylmydriatin, having probably the formula

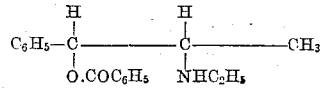

4. A new composition of matter comprising a mixture of benzoyl mono-ethyl- and di-ethylmydriatin.

In testimony whereof, I affix my signature.

NAGAYOSHI NAGAI.